(12) United States Patent
Hashimoto et al.

(10) Patent No.: US 12,496,029 B2
(45) Date of Patent: Dec. 16, 2025

(54) MEDICAL IMAGE PROCESSING APPARATUS, X-RAY DIAGNOSTIC APPARATUS, AND STORAGE MEDIUM

(71) Applicant: CANON MEDICAL SYSTEMS CORPORATION, Otawara (JP)

(72) Inventors: Saki Hashimoto, Nasushiobara (JP); Kazuo Imagawa, Nasushiobara (JP); Yoshiteru Kobayashi, Sakura (JP); Yuichiro Watanabe, Yaita (JP); Takuya Aida, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 455 days.

(21) Appl. No.: 18/189,473

(22) Filed: Mar. 24, 2023

(65) Prior Publication Data

US 2023/0309941 A1 Oct. 5, 2023

(30) Foreign Application Priority Data

Mar. 30, 2022 (JP) .................................. 2022-056824

(51) Int. Cl.
*A61B 6/50* (2024.01)
*A61B 6/00* (2006.01)
(Continued)

(52) U.S. Cl.
CPC .............. *A61B 6/507* (2013.01); *A61B 6/032* (2013.01); *A61B 6/501* (2013.01); *A61B 6/504* (2013.01);
(Continued)

(58) Field of Classification Search
CPC ......... A61B 6/507; A61B 6/032; A61B 6/501; A61B 6/504; A61B 6/5217; A61B 6/5235;
(Continued)

(56) References Cited

U.S. PATENT DOCUMENTS 10,561,381 B2 * 2/2020 Wakai .................. A61B 6/5247
10,842,446 B2 * 11/2020 Ishii ........................ A61B 6/488
(Continued)

FOREIGN PATENT DOCUMENTS

JP 2015-112232 A 6/2015

*Primary Examiner* — Shefali D Goradia
(74) *Attorney, Agent, or Firm* — Oblon, McClelland, Maier & Neustadt, L.L.P.

(57) ABSTRACT

According to one embodiment, a medical image processing apparatus includes processing circuitry. The processing circuitry acquires correspondence information, based on 3D medical image data of an object, that corresponds a blood vessel to information on a dominant area of the blood vessel in a region of the object. The processing circuitry acquires a plurality of X-ray images each including the blood vessel that are collected at different time phases on the object. The processing circuitry identifies, based on the plurality of X-ray images, a flow changed vessel in which blood flow has changed between the different time phases. The processing circuitry performs registration between the flow changed vessel and the 3D medical image data. The processing circuitry estimates information on the dominant area corresponding to the flow changed vessel based on registration results and the acquired correspondence information.

20 Claims, 7 Drawing Sheets

(51) Int. Cl.
*A61B 6/03* (2006.01)
*G06T 5/50* (2006.01)
*G06T 7/00* (2017.01)
*G06T 7/30* (2017.01)

(52) U.S. Cl.
CPC .......... *A61B 6/5217* (2013.01); *A61B 6/5235* (2013.01); *G06T 5/50* (2013.01); *G06T 7/0016* (2013.01); *G06T 7/30* (2017.01); *G06T 2200/04* (2013.01); *G06T 2207/10116* (2013.01); *G06T 2207/20224* (2013.01); *G06T 2207/30016* (2013.01); *G06T 2207/30104* (2013.01)

(58) Field of Classification Search
CPC ....... A61B 6/466; A61B 6/481; A61B 6/5223; A61B 6/5229; A61B 6/5241; A61B 6/5264; A61B 6/5288; A61B 6/5294; A61B 6/03; G06T 5/50; G06T 7/0016; G06T 7/30; G06T 2200/04; G06T 2207/10116; G06T 2207/20224; G06T 2207/30016; G06T 2207/30104
See application file for complete search history.

(56) References Cited

U.S. PATENT DOCUMENTS

| | | | |
|---|---|---|---|
| 11,334,998 B2 * | 5/2022 | Oikawa | A61B 6/481 |
| 2006/0233430 A1 * | 10/2006 | Kimura | G06T 7/30 |
| | | | 382/128 |
| 2012/0063663 A1 * | 3/2012 | Kawasaki | G06T 7/0014 |
| | | | 382/133 |
| 2015/0161800 A1 | 6/2015 | Nagae et al. | |
| 2018/0055472 A1 | 3/2018 | Nagae et al. | |
| 2023/0282336 A1 * | 9/2023 | Fuchigami | G16H 30/40 |
| | | | 382/100 |

* cited by examiner

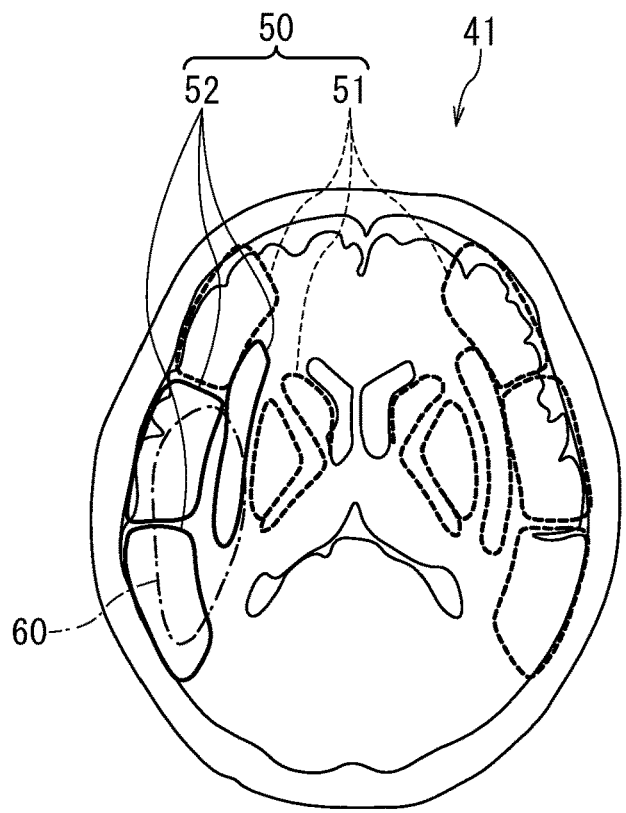
FIG. 2
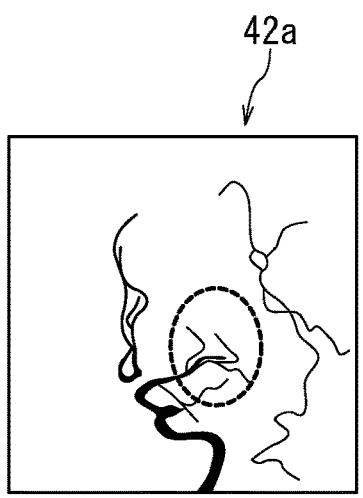 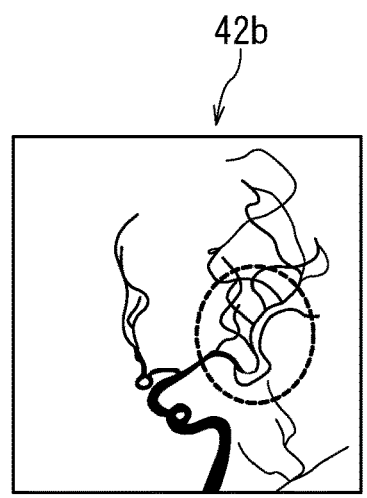
FIG. 3A  FIG. 3B

MEDICAL IMAGE PROCESSING APPARATUS, X-RAY DIAGNOSTIC APPARATUS, AND STORAGE MEDIUM

CROSS-REFERENCE TO RELATED APPLICATIONS

This application claims the benefit of priority of Japanese Patent Application No. 2022-056824, filed Mar. 30, 2022, the entire contents of which are incorporated herein by reference.

FIELD

Embodiments described herein relate generally to a medical image processing apparatus, an X-ray diagnostic apparatus, and a storage medium.

BACKGROUND

X-ray subtraction angiography is an examination using an X-ray diagnostic apparatus. In this examination, images of the same region of the object are taken before the injection of contrast agent (mask image) and after the injection of contrast agent (contrast image), respectively. Then, an image (subtraction image) is generated by calculating the difference between these images.

The subtraction image is an image from which the image of the blood vessel contrasted by the contrast agent is extracted. Therefore, by observing the subtraction image, the user can easily grasp the state of blood flow in the object. For example, when performing thrombus (clot) retrieval procedure using a catheter, the user can tell how much of the infarcted blood vessel is being perfused to the periphery by observing whether or not the image of the blood vessel downstream of the thrombus appears in the subtraction images before and after the procedure, and then determine the time to terminate the thrombus retrieval therapy.

However, even when a certain degree of peripheral perfusion is observed and the thrombus retrieval procedure is considered successfully done, some patients do not have a good prognosis. This is because, in thrombus retrieval procedure for cerebral infarction for example, from contrast images alone, although the amount of blood perfusion and the approximate location of the brain region dominated (nourished) by the perfused blood vessel can be determined, it is difficult to know detailed prognostic information about the regions nourished by perfused blood vessels, such as whether the nourished regions are related to sensory or motor functions, or whether they are important regions that should be perfused.

BRIEF DESCRIPTION OF THE DRAWINGS

FIG. 2 is an illustration showing an example of classification areas used in the calculation of the ASPECTS score in an X-ray CT image of the brain.

FIG. 3A is an illustration showing an example of an X-ray image including blood vessels before a thrombus retrieval procedure.

FIG. 3B is an illustration showing an example of an X-ray image including a blood vessel after the thrombus retrieval procedure.

FIG. 6 is an illustration showing an example of an enhanced image showing improved blood flow in the dominant area of interest that the user pays attention to.

DETAILED DESCRIPTION

Hereinbelow, a description will be given of a medical image processing apparatus, an X-ray diagnostic apparatus, and a storage medium according to embodiments of the present invention with reference to the drawings.

According to one embodiment, a medical image processing apparatus includes processing circuitry. The processing circuitry acquires correspondence information, based on 3D medical image data of an object, that corresponds a blood vessel to information on a dominant area of the blood vessel in a region of the object. The processing circuitry acquires a plurality of X-ray images each including the blood vessel that are collected at different time phases on the object. The processing circuitry identifies, based on the plurality of X-ray images, a flow changed vessel in which blood flow has changed between the different time phases. The processing circuitry performs registration between the flow changed vessel with the 3D medical image data. The processing circuitry estimates information on the dominant area corresponding to the flow changed vessel based on registration results and the acquired correspondence information.

Figure 1:
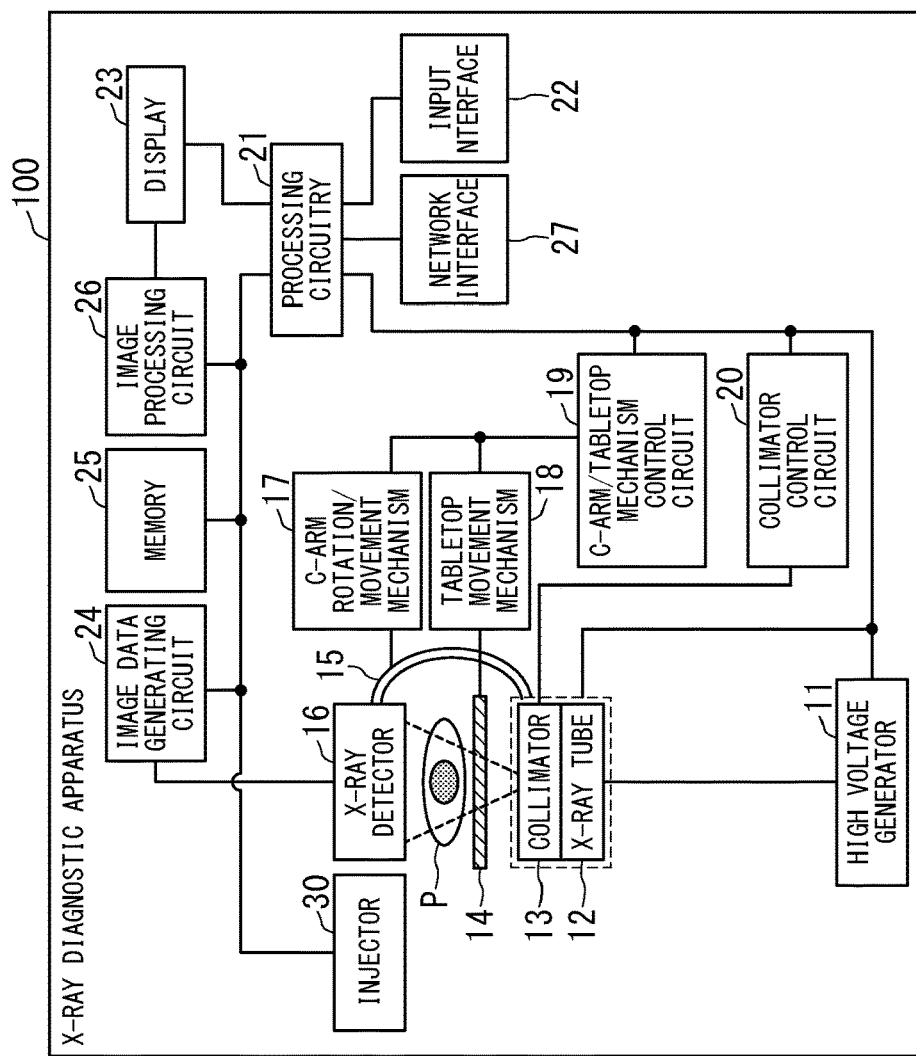
FIG. 1 is a block diagram showing an example configuration of a medical image processing system including an X-ray diagnostic apparatus and a medical image processing apparatus.
Figure 1:
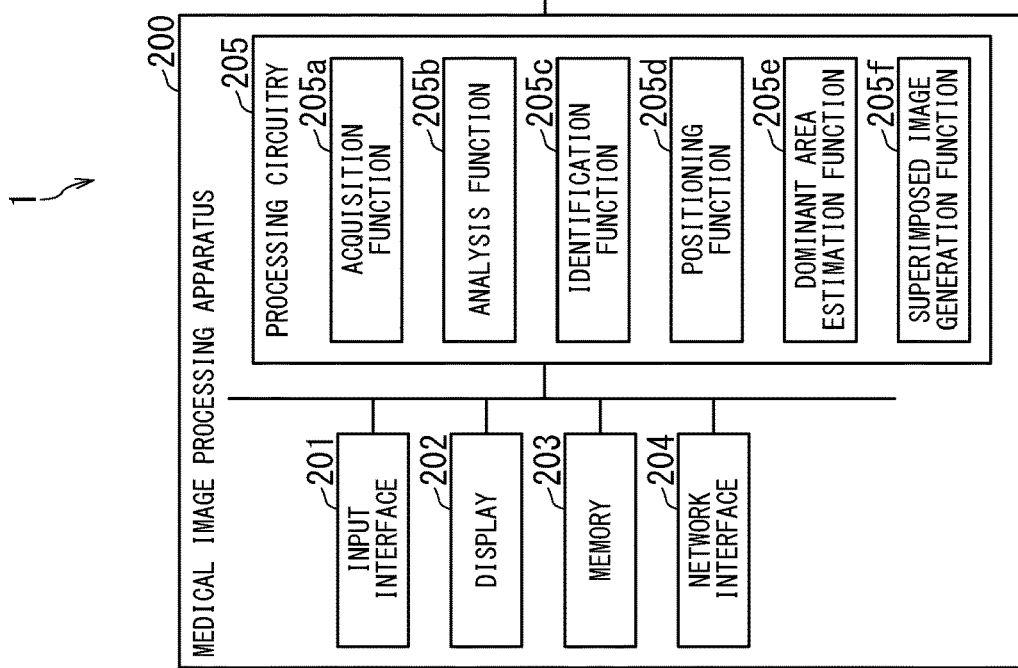

FIG. 1 is a block diagram showing an example configuration of a medical image processing system including an X-ray diagnostic apparatus 100 and a medical image processing apparatus 200 according to an embodiment. The X-ray diagnostic apparatus 100 can be an X-ray angio device or the like. In this embodiment, an example of a case in which an X-ray angio system with a C-arm 15 is used as the X-ray diagnostic apparatus 100 is shown (see FIG. 1). The X-ray angio system as the X-ray diagnostic apparatus 100 is not limited to a single-plane type X-ray angio system with a C-arm, but may be a bi-plane type X-ray angio system with a C-arm and an Ω-arm.

The X-ray diagnostic apparatus 100 includes a high voltage generator 11, an X-ray tube 12, a collimator 13, a tabletop 14, a C-arm 15, an X-ray detector 16, C-arm rotation/movement mechanism 17, a tabletop movement mechanism 18, C-arm/tabletop mechanism control circuit 19, a collimator control circuit 20, processing circuitry 21, an input interface 22, and a display 23. The X-ray diagnostic apparatus 100 also includes an image data generating circuit 24, a memory 25, an image processing circuit 26, and a network interface 27.

The X-ray diagnostic apparatus 100 is also connected to an injector 30. The X-ray diagnostic apparatus 100 has various circuits that are interconnected as shown in FIG. 1, sending and receiving various electrical signals among the circuits and sending and receiving electrical signals from the injector 30.

The injector 30 is a device used to inject contrast agent from a catheter inserted into the object. The injection of contrast agent from the injector 30 is performed according to the injection instructions received via the processing circuitry 21. Specifically, the injector 30 executes the contrast agent injection according to the contrast agent injection conditions, including the contrast agent injection start instruction, injection stop instruction, injection speed, and the like, received from the processing circuitry 21. The injector 30 may also start and stop injection according to injection instructions input directly to the injector 30 by the user (including the surgeon).

Each processing function of the X-ray diagnostic apparatus 100 shown in FIG. 1 is stored in the memory 25 in the form of a program executable by a computer. The C-arm/tabletop mechanism control circuit 19, the collimator control circuit 20, processing circuitry 21, the image data generating circuit 24, and the image processing circuit 26 are processors that read programs from the memory 25 and execute the programs to realize the functions corresponding to each program. processor. Each circuit that reads a program has a function corresponding to the read program.

The high voltage generator 11 is controlled by the processing circuitry 21 and generates high voltage to supply to the X-ray tube 12. The X-ray tube 12 generates X-rays by the high voltage supplied from the high voltage generator 11.

The collimator 13 is controlled by the collimator control circuit 20 and narrows down the X-rays generated by the X-ray tube 12 such that the X-rays are selectively irradiated to the region of interest in the object. For example, the collimator 13 has four slidable aperture blades, and by sliding these aperture blades of the collimator 13 under the control of the collimator control 20, the X-rays generated by the X-ray tube 12 is narrowed down and irradiated to the object. The tabletop 14 is placed on a bed (not shown), on which the object is placed.

The X-ray detector 16 detects the X-rays transmitted through the object. For example, the X-ray detector 16 has detector elements arranged in a matrix. Each detector element converts the X-rays transmitted through the object into electrical signals and transmits them to the image data generating circuit 24.

The C-arm 15 holds the X-ray tube 12, the collimator 13, and the X-ray detector 16. The X-ray tube 12 and the collimator 13 are positioned by C-arm 15 to face the X-ray detector 16 across the object.

The C-arm rotation/movement mechanism 17 is a mechanism for rotating and moving the C-arm 15. The tabletop movement mechanism 18 is a mechanism for moving the tabletop 14. The C-arm/tabletop mechanism control circuit 19 is controlled by the processing circuitry 21 and controls the C-arm rotation/movement mechanism 17 and the tabletop movement mechanism 18 to adjust rotation and movement of the C-arm 15 and movement of the tabletop 14. The collimator control circuit 20 is controlled by the processing circuitry 21 and controls the irradiation range of X-rays irradiated to the object by adjusting the opening degree of the aperture blades of the collimator 13.

The image data generating circuit 24 generates image data using electrical signals converted from X-rays by the X-ray detector 16 and stores the generated image data in the memory 25. For example, the image data generating circuit 24 performs current/voltage conversion, Analog/Digital conversion, and parallel/serial conversion on the electrical signals received from the X-ray detector 16 to generate image data.

The image data generating circuit 24 generates image data before contrast agent injection (mask image) and image data after contrast agent injection (contrast image) and stores them in the memory 25.

The memory 25 stores the image data generated by the image data generating circuit 24. For example, the memory 25 stores image data of objects before and after the contrast agent is injected. The memory 25 may store DSA (Digital Subtraction Angiography) images obtained by subtracting these image data.

The image processing circuit 26 performs various image processing on the image data stored in the memory 25. For example, the image processing circuit 26 may generate a DSA image by subtracting the mask image and contrast image stored in the memory 25.

Such subtraction may be performed after calculating the natural logarithm of the X-ray intensities of the contrast and mask images. Alternatively, subtraction can also be performed by dividing the contrast image by the mask image and then calculating the natural logarithm of the result of the division process. Subtraction images make structures belonging blood vessel system more visible by removing the background including structures such as bone.

The image processing circuit 26 can minimize registration errors due to body movement by using at least one frame immediately before contrast agent injection as a mask image. The image processing circuit 26 can also perform noise reduction processing using image processing filters such as moving average (smoothing) filters, Gaussian filters, and median filters. In other words, the image processing circuit 26 can perform processing, including misregistration correction and noise reduction, on each of a plurality groups of X-ray images taken over time using a contrast agent, as a pre-processing or post-processing of subtraction.

The input interface 22 is realized by a trackball, switch button, mouse, keyboard, or the like for setting a predetermined region (e.g., a target region for correction processing in a subtraction image) or the like. The input interface 22 is connected to the processing circuitry 21 and converts input operations received from the user into electrical signals and outputs them to processing circuitry 21.

The display 23 displays images for receiving user instructions and differential images generated by the image processing circuit 26.

The network interface 27 is connected to the processing circuitry 21 and controls the transmission and communication of various data to and from other devices such as the medical image processing apparatus 200 connected via a network. For example, the network interface 27 is realized by a network card or network adapter. The network interface 27 transmits X-ray images stored in the memory 25 to the medical image processing apparatus 200.

The processing circuitry 21 is a processor that controls the operation of the entire X-ray diagnostic apparatus 100. For example, the processing circuitry 21 executes various processes by reading programs from the memory 25 and executing the programs corresponding to the functions for controlling the entire apparatus. The processing circuitry 21 controls the high voltage generator 11 according to the user's instructions via the input interface 22 to adjust the voltage supplied to the X-ray tube 12, thereby controlling the X-ray dose irradiated to the object and the on/off of the X-ray irradiation.

The processing circuitry 21 also controls the image data generation process executed by the image data generating circuit 24 as well as the image processing and analysis process executed by the image processing circuit 26 according to the instructions from the user. The processing circuitry 21 also controls the display 23 to show images for receiving user instructions and images stored in the memory 25. The processing circuitry 21 also controls the injection timing of the contrast agent by sending signals to the injector 30 to start and end the injection of the contrast agent.

Meanwhile, the medical image processing apparatus 200 includes an input interface 201, a display 202, a memory 203, a network interface 204, and processing circuitry 205.

The network interface 204 is connected to the processing circuitry 205 and controls the transmission and communication of various data to and from other devices such as various medical image diagnostic apparatuses connected via a network. The network interface 204 may be realized by a network card, network adapter, or the like. The network interface 204 receives X-ray images from X-ray diagnostic apparatus 100 and provides them to processing circuitry 205.

The memory 203 is connected to the processing circuitry 205 and stores various data. For example, the memory 203 is realized by semiconductor memory devices such as RAM (Random Access Memory), flash memory, or hard disks, optical disks, and the like. The memory 203 stores X-ray images such as mask images, contrast images, and subtraction images received from the X-ray diagnostic apparatus 100.

The input interface 201 is connected to the processing circuitry 205 and converts input operations received from the user into electrical signals and outputs them to the processing circuitry 205. The input interface 201 can be realized by a trackball, switch button, mouse, keyboard, touch panel, and the like.

The display 202 is composed of a common display output device, such as a liquid crystal display or an OLED (Organic Light Emitting Diode) display, for example, and displays various images such as X-ray images according to the control of the processing circuitry 205.

The processing circuitry 205 is a processor that realizes the function of controlling each component of the medical image processing apparatus 200. The processing circuitry 205 stores the X-ray images output from the network interface 204 in the memory 203. The processing circuitry 205 also reads the X-ray image data from the memory 203 and displays it on the display 202.

The processing circuitry 205 also reads and executes the medical image processing program stored in the memory 203 to estimate prognostic information about the dominant area of the blood vessel whose blood flow has been changed by the procedure (hereinafter referred to as flow changed vessel).

Specifically, as shown in FIG. 1, the processor of processing circuitry 205 realizes an acquisition function 205*a*, an analysis function 205*b*, an identification function 205*c*, a positioning function 205*d*, a dominant area estimation function 205*e*, and a superimposed image generation function 205*f*. Each of these functions is stored in the memory 25 in the form of a program.

The acquisition function 205*a* acquires 3D medical image data of the object from other medical image processing apparatuses, and further acquires correspondence information, based on the 3D medical image data, between the blood vessel and information on the dominant area of the blood vessel in the region of the object.

CT volume data generated by an X-ray CT (Computed Tomography) apparatus or MR volume data generated by MRI (Magnetic Resonance Imaging) apparatus can be used as the 3D medical image data. The correspondence information may be obtained from the X-ray CT apparatus or the MRI apparatus.

The acquisition function 205*a* acquires a plurality of X-ray images including blood vessels of the object that are collected at different time phases.

The X-ray images are acquired using the X-ray tube 12, collimator 13, X-ray detector 16, and other X-ray imaging-related configurations (imaging device) of the X-ray diagnostic apparatus 100. The information on geometric parameters, including the position and angle of C-arm 15 and the position of the tabletop 14 during X-ray imaging, may be stored in the memory 203.

The different time phases may be, for example, in thrombus retrieval procedure of cerebral infarction, the time phases before and after the procedure to retrieve the thrombus/clot in the blood vessel. Also, in PCI (percutaneous coronary intervention), the different time phases may be before and after the procedure to dilate the coronary artery that causes ischemia. In TACE (transcatheter arterial chemoembolization), the different time phases may be before and after the procedure to embolize the blood vessels feeding the hepatocellular carcinoma.

The following is an example of estimating prognostic information about the dominant area of blood vessels whose blood flow has been altered by the thrombus retrieval procedure of cerebral infarction.

FIG. 2 is an illustration showing an example of a classified region (hereinafter referred to as classification area) 50 that is used in the calculation of the ASPECTS score in the X-ray CT image of the brain.

When the region of the object is the brain, the acquisition function 205*a* acquires the correspondence information that correlates the areas classified by brain function to the blood vessels that nourish each area. The areas classified by brain function can be the classification areas 50 used in the calculation of the ASPECTS score (see FIG. 2) or the areas according to the Brodmann area. In the example shown in FIG. 2, the correspondence information is the information that correlates the blood vessel to the classification areas 50 used in the calculation of the ASPECT score.

When there is no thrombus, all of the classification areas 50 are nourished areas (hereinafter referred to as normal areas) 51 (see dashed line in FIG. 2). When there is blood flow deteriorates due to thrombus, the classification areas 50 corresponding to the areas of the blood vessels downstream of the thrombus that are not nourished areas (hereinafter referred to as embolic areas) 52.

In addition, the analysis function 205*b* analyzes the 3D medical image data of the object to obtain lesion location and area information. FIG. 2 shows an example of the infarction nest area 60 (see the dotted line in FIG. 2) obtained by the analysis function 205*b*.

FIG. 3A is an illustration showing an example of an X-ray image 42*a* including blood vessel before a thrombus retrieval procedure, and FIG. 3B is an example of the X-ray image 42*b* including blood vessel after thrombus retrieval procedure.

The X-ray diagnostic apparatus 100 acquires X-ray images from multiple directions, including the blood vessel, before and after clot retrieval. In the single-plane type X-ray imaging, for example, X-ray images can be acquired from multiple directions by performing X-ray imaging from each of the two directions of the front and side of the object. In the biplane type X-ray imaging can be performed simultaneously from directions of the front and side of the object.

The X-ray images from multiple directions including the blood vessel can be DSA (Digital Subtraction Angiography) images, X-ray images equivalent to DSA images generated without using a mask image, or fluoroscopic contrast images. When the X-ray images are DSA images, the X-ray images 42a and 42b before and after the procedure are images where structures such as bones are removed and contrast blood vessels are extracted (see FIGS. 3A and 3B). When the X-ray images are images equivalent to DSA images, then each of the X-ray images 42a and 42b before and after the procedure are images from which structures such as bones are removed and contrast vessels are extracted, similar to the DSA image. Further, the X-ray image equivalent to the DSA image generated without using a mask image is an X-ray image generated from the contrast image based on a learned model that has been trained to output an image equivalent to the DSA image in response to an input of a contrast image. When the X-ray image is a fluoroscopic contrast image, each of the X-ray images 42a and 42b before and after the procedure is an image in which the contrasted blood vessels are depicted along with background such as structures.

The X-ray images imaged from multiple directions including the blood vessel may be two-dimensional images or may be three-dimensional images generated based on volume data reconstructed from multiple X-ray images for rotational acquisition. The X-ray images imaged from multiple directions are used for registration to align with the 3D medical image data. For example, when the X-ray images from multiple directions including the blood vessel are two 2D images from two directions, the positioning function 205d may perform registration between the X-ray images and the 3D medical image data based on a stereo geometric model using the two 2D images.

Figures 4A, 4B:
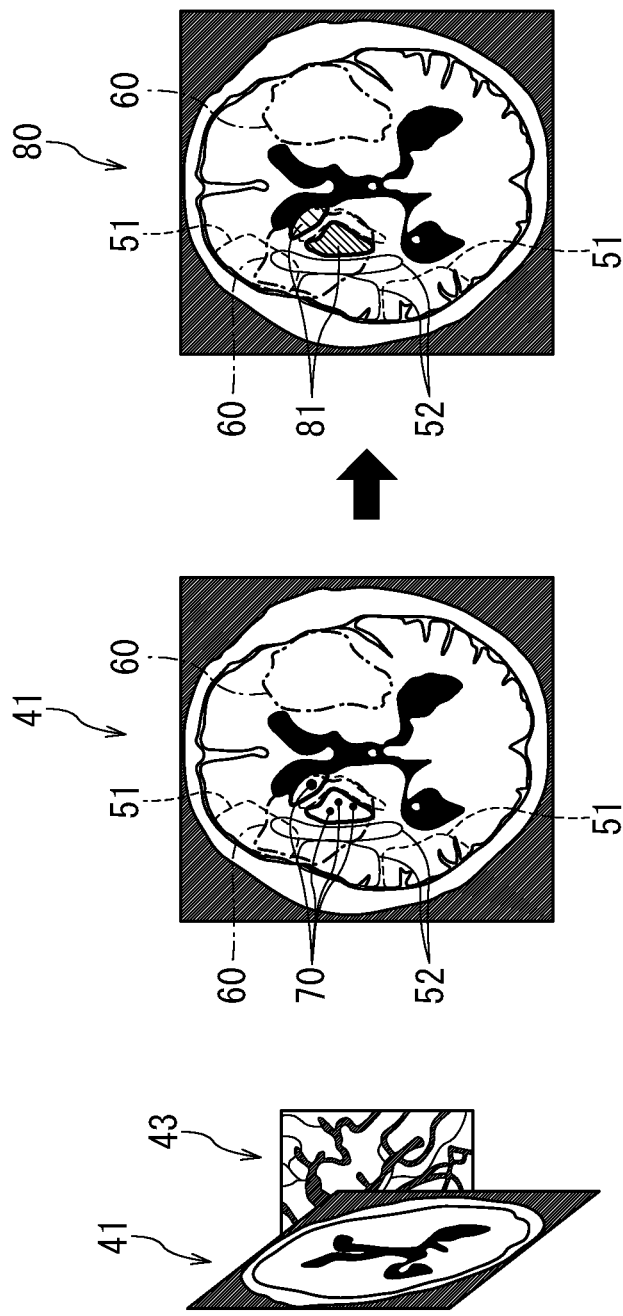
FIG. 4A is a schematic illustration of the registration of the flow changed vessel image and the X-ray CT image.
FIG. 4B is an illustration showing an example of a superimposed image in which an enhanced image showing the dominant area corresponding to the flow changed vessel is superimposed on the X-ray CT image.

As shown in FIGS. 3A and 3B, a blood vessel that had been embolized by a thrombus is perfused by the thrombus retrieval procedure. FIG. 4A is a schematic illustration of the registration of a flow changed vessel image 43 and X-ray CT image 41, and FIG. 4B shows an example of superimposed image 80, in which enhanced image 81 showing the dominant area corresponding to the flow changed vessel is superimposed on the X-ray CT image 41.

The identification function 205c identifies flow changed vessels 70 whose blood flow has changed between different time phases based on multiple X-ray images. The identification function 205c is an example of an identification part. The function of identification function 205c may be realized by image processing circuit 26.

Specifically, the identification function 205c obtains an image of flow changed vessel 70 (hereinafter referred to as flow changed vessel image 43) by subtracting the X-ray images before and after the procedure. When the distance between the X-ray tube focus and the X-ray detector (SID: Source Image Receptor Distance) or FOV (Field of View) has changed in the imaging before and after the procedure, the identification function 205c subtracts the images from each other by considering the difference in magnification of the X-ray images 42a and 42b before and after the procedure. When there is body movement of the object before and after the procedure, the identification function 205c may perform image processing to calculate the amount of positional shift due to body movement, and subtract the images with pixel shifts to reduce misregistration due to shift.

The positioning function 205d performs registration between the flow changed vessel 70 and the 3D medical image data.

The positioning function 205d may perform registration between the flow changed vessel image 43 and the X-ray CT image 41 using the blood vessel as a landmark. In this case, for example, the contrast blood vessel image taken from multiple directions before thrombus retrieval and the contrast CT blood vessel image obtained in advance before the procedure are aligned with the blood vessel as a landmark.

The positioning function 205d may also perform registration between the flow changed vessel 70 and the 3D medical image data by performing registration between the intraoperative fluoroscopic image and the contrast CT blood vessel image obtained in advance before the procedure based on the thrombus location information.

The thrombus location information can be estimated, for example, from the position of a marker on the stent. Intraoperatively, the user penetrates the thrombus with the thrombus retrieval device and then entangles the mesh of the stent around the thrombus. At this time, the user dilates the stent while looking at the marker position on the fluoroscopic image, and then performs DSA imaging. Therefore, the location of the thrombus can be estimated from the position of the marker.

When the stent is made of an X-ray permeable material such as a biodegradable or bioabsorbable polymer, the stent is provided with a marker made of a radiopaque material such as metal. The markers may be provided at both ends of the stent or may be dispersed as a powder in the body of the stent.

When thrombus position information is estimated from the position of the marker on the stent, the positioning function 205d can performs registration between the flow changed vessel 70 and the 3D medical image data by performing registration between the intraoperative fluoroscopic image with the contrast CT blood vessel image obtained before the procedure based on the thrombus position estimated from the position of the marker on the device.

By tracking the markers in the fluoroscopic images and memorizing the positions of the markers in the last fluoroscopic image before switching to DSA imaging, the position of the thrombus in the X-ray image can be identified based on the memorized marker positions. In addition, according to the software applications for determining the infarct site that are installed on the X-ray CT apparatus, the upstream front position of the thrombus in the 3D CT image data can be determined. Therefore, the flow changed vessel 70 can be aligned with the X-ray CT image by aligning the X-ray image with the X-ray CT image based on the infarct location depicted in the X-ray CT image and the X-ray image corresponding to the time phase before the procedure. When the MRI apparatus has an application for determining the infarct location, the information on the infarct site obtained in the same manner using the application may be used to align the flow changed vessel 70.

The positioning function 205d may also perform registration between the flow changed vessel 70 and the 3D medical image data by performing registration between the X-ray fluoroscopy image and the X-ray CT image based on structures such as bones.

The dominant area estimation function 205e estimates the dominant area (embolic area 52) corresponding to the flow changed vessel 70, based on the positioning result acquired by the positioning function 205d (see FIG. 4A) and the correspondence information (information that corresponds blood vessel with information on the dominant area of the blood vessel in the region of the object) (see the left of FIG. 4B). The dominant area information includes, for example, the ASPECT score corresponding to the dominant area and information on the sensory and motor functions governed by the dominant area.

The superimposed image generation function 205f generates a superimposed image 80 in which the enhanced image 81 showing the embolic area 52 corresponding to the flow changed vessel 70 estimated by the dominant area estimation function 205e is superimposed on the medical image acquired before the procedure, and displays the superimposed image 80 on a display device such as display 23 (see the right of FIG. 4B). The medical images acquired before the procedure can be, for example, X-ray CT images based on 3D CT volume data, SPECT images, fusion images of SPECT and X-ray CT, angiographic images, and the like.

Although FIG. 4B shows an example of superimposing the enhanced image 81 on a single slice image, since classification area 50 has a volume, the enhanced image 81 may be generated on all slices or voxels corresponding region where the embolic area 52 corresponding the flow changed vessel 70 is included. The superimposed image generation function 205f may generate the enhanced image 81 such that the entire area is shown in a single color when there is a change in blood flow in even only one area within the embolic area 52, or may generate the enhanced image 81 such that the color density of the entire area corresponding to the embolic area 52 changes according to the changes in the amount of blood flow per unit area, i.e., the number and/or size of areas of blood flow change per unit area (see FIG. 4B).

The enhanced image 81 may also be generated such that the color type differs between the areas where the blood flow increased due to thrombus retrieval and the areas where the blood flow did not increase.

Figure 5:
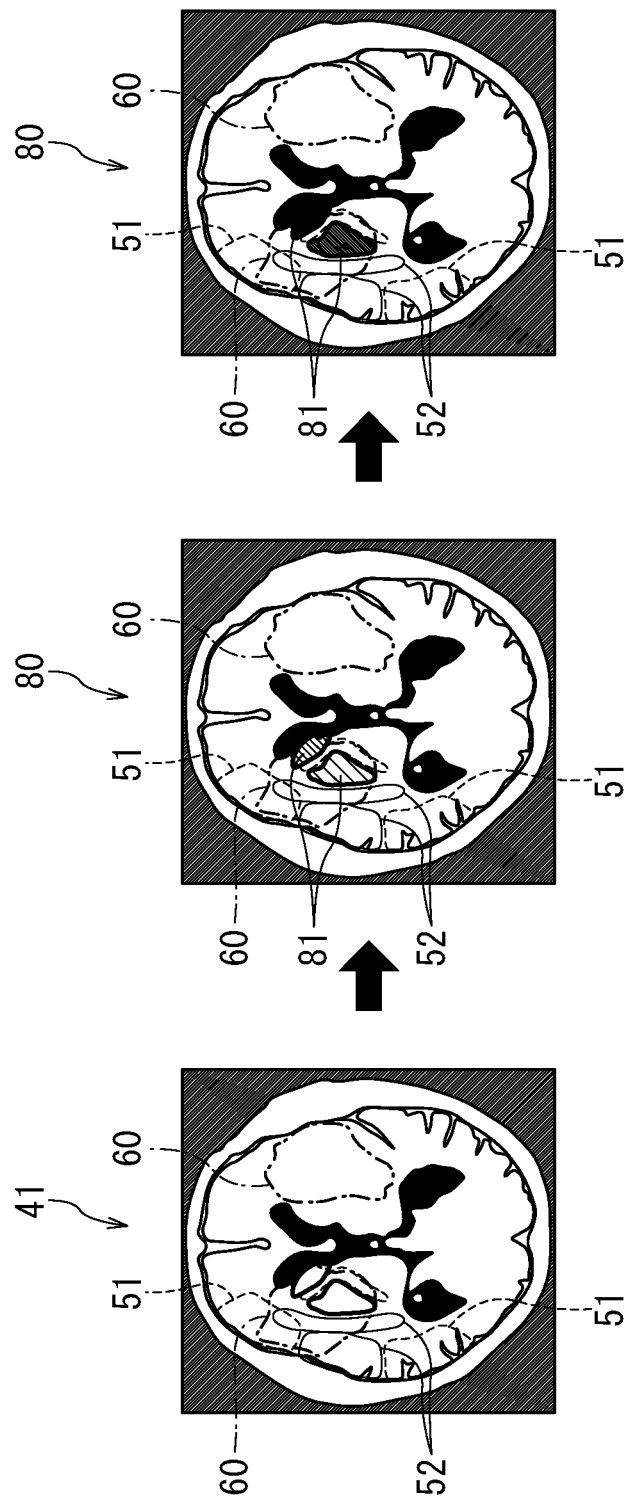
FIG. 5 is an illustration showing an example of the changes in the superimposed image when the thrombus retrieval procedure is repeated.

FIG. 5 illustrates an example of the changes in superimposed image 80 when the thrombus retrieval procedure is repeated.

The thrombus may not be fully retrieved in a single procedure (see the left and center of FIG. 5). In this case, the user is expected to perform a second procedure (see center and right of FIG. 5) and check the improvement of blood flow on the DSA images. Therefore, after each thrombus retrieval procedure and DSA imaging, the flow changed vessel 70 may be identified and the enhanced image 81 may be updated and reflected in the superimposed image 80. In this case, as the procedure is repeated, the acquisition function 205a acquires multiple X-ray images of the time phases before and after each procedure. For each procedure, the identification function 205c identifies the flow changed vessels 70 where the blood flow has changed between the time phases before and after the procedure. The positioning function 205d performs registration between the flow changed vessel 70 with the 3D medical image data for each procedure. Then, as shown in FIG. 5, the superimposed image generation function 205f generates the enhanced image 81 for each procedure such that, for example, the color density or the color of the entire area of the embolic area 52 changes according to the number and/or size of areas of the blood flow change per unit area.

Figure 6:
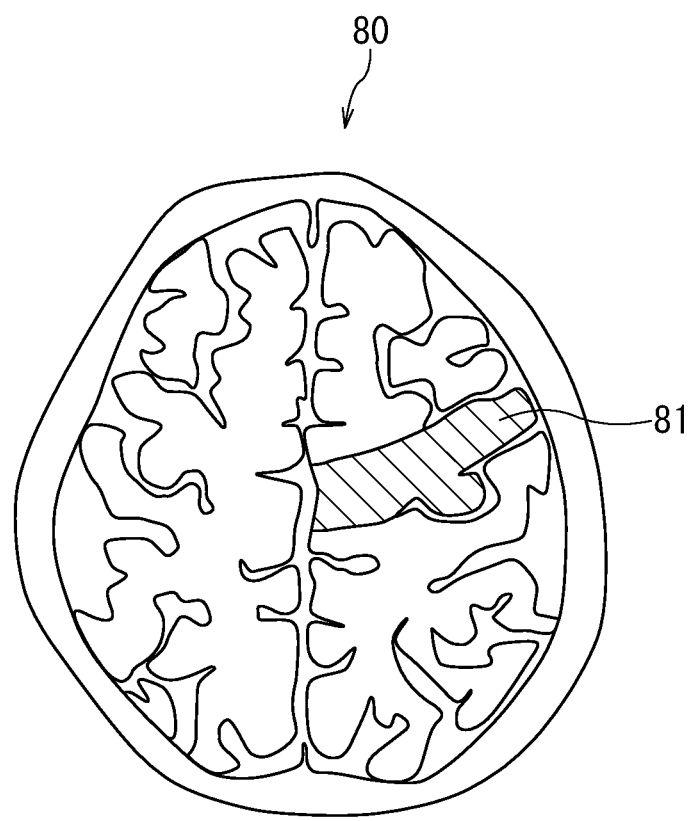

FIG. 6 is an illustration of an example of the enhanced image 81 showing improved blood flow in the dominant area of interest to the user. FIG. 6 shows an example when the dominant area of interest is the primary motor cortex.

When there is an important area that the user, including the surgeon, pays attention to (such as the primary motor cortex) or an important area that the user should focus on, the superimposed image generation function 205f may generate the enhanced image 81 that allows the user to intuitively grasp whether or not blood flow has improved in the relevant dominant area of interest (see FIG. 6). When the dominant area of interest to the user among the dominant areas included in the correspondence information is included in the dominant area corresponding to the flow changed vessel 70, the superimposed image generation function 205f generates the superimposed image 80 by generating the enhanced image 81 where at least the dominant area of interest is highlighted. The enhanced image 81 may be used not only during angiotherapy. For example, before the start of angiotherapy and after the preoperative X-ray CT imaging, the enhanced image 81 may be used to make the dominant area of interest is emphasized such that the user can easily grasp the location of the dominant area of interest in the X-ray CT image 41.

The superimposed image generation function 205f may generate the enhanced images 81 for each area classified by brain function, such as classification areas 50 used in the calculation of the ASPECTS score, as shown in FIG. 2. Additionally or alternatively, the enhanced image 81 may also be generated to highlight the infarction nest area 60 to assist in understanding the location of the infarction nest area 60.

Figure 7:
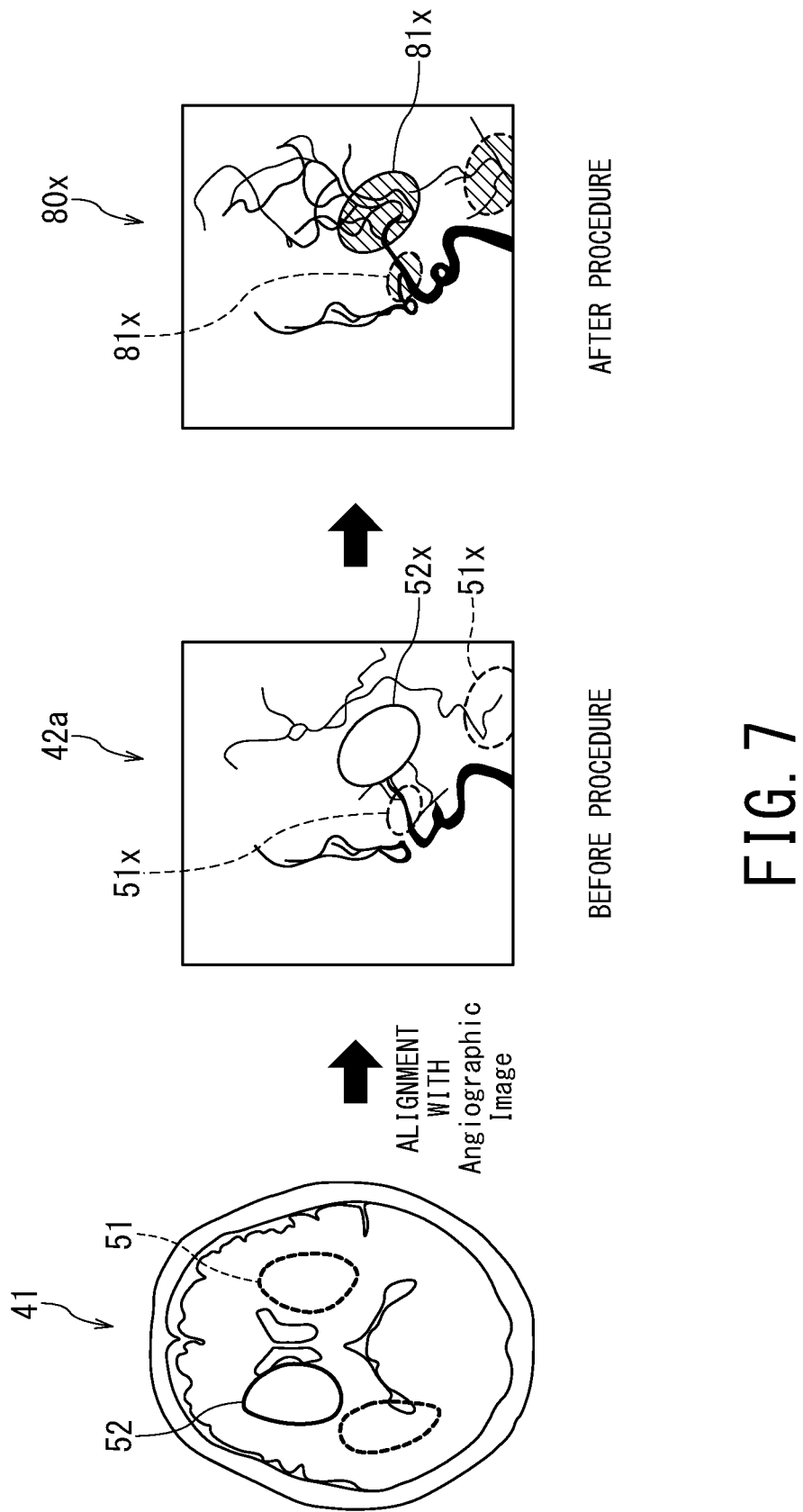
FIG. 7 is an illustration showing an example of a superimposed image in which the enhanced image is superimposed on the X-ray image.

FIG. 7 illustrates an example of a superimposed image 80x in which the enhanced image 81x is superimposed on the X-ray image.

The enhanced image 81x may be superimposed on the x-ray image to highlight the dominant area with improved blood flow. In this case, when the positions of areas 51x and 52x on the angiogram, which corresponds to the anatomical positions of the dominant areas 51 and 52 corresponding to a predetermined blood vessel obtained from the preoperative X-ray CT image 41, overlap with the anatomical position of the blood vessel in the X-ray image acquired after the procedure, then the superimposed image generation function 205f may determine that that the dominant areas 51x and 52x have very likely been treated, and generate the enhanced image 81x that emphasizes these areas 51x and 52x, and superimpose such enhanced image 81x on the X-ray image (see FIG. 7). The X-ray image to be superimposed by the enhanced image 81x may be the X-ray image 42a before the procedure, the intraoperative X-ray image, the X-ray image 42b after thrombus collection, or the flow changed vessel image 43.

When there is an area that the user, including the surgeon, has focused on as an important area (such as the primary motor cortex) or an important area that the user should focus on, the superimposed image generation function 205f may generate the superimposed image 80x by generating the enhanced image 81x that enables the user to intuitively grasp whether the blood flow in the dominant area of interest has improved or not, and then superimposing the enhanced image 81x on the X-ray image.

Figure 8A:
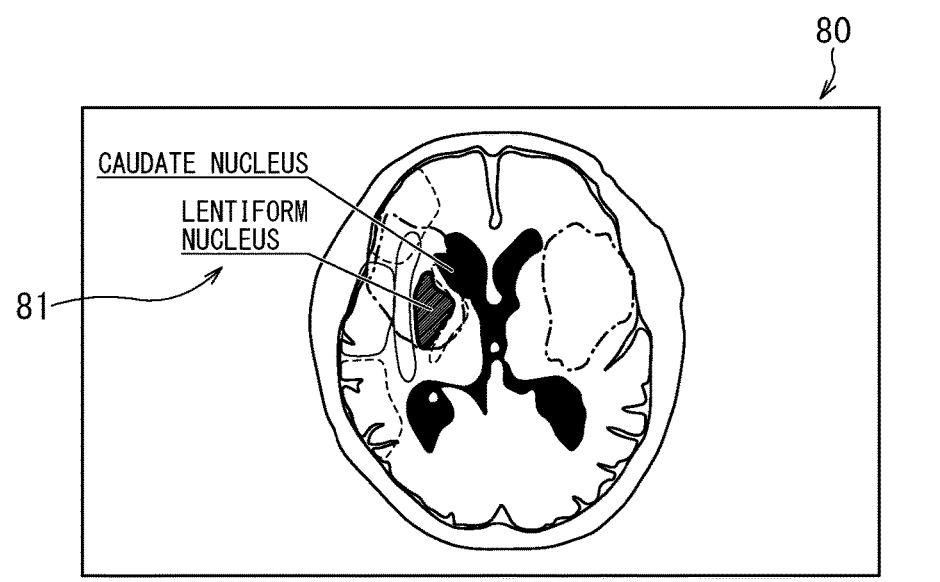
FIG. 8A is an illustration showing a first variant of the superimposed image.
Figure 8B:
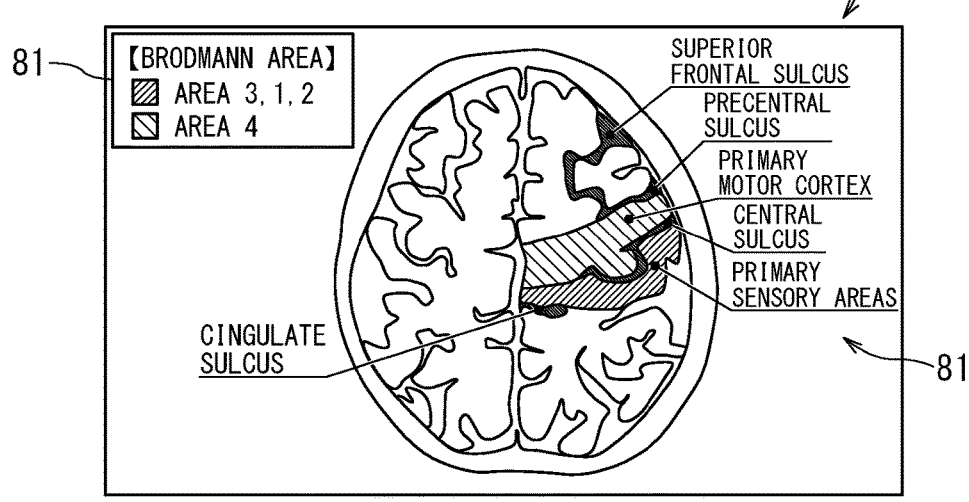
FIG. 8B is an illustration showing a second variant of the superimposed image.
Figure 8C:
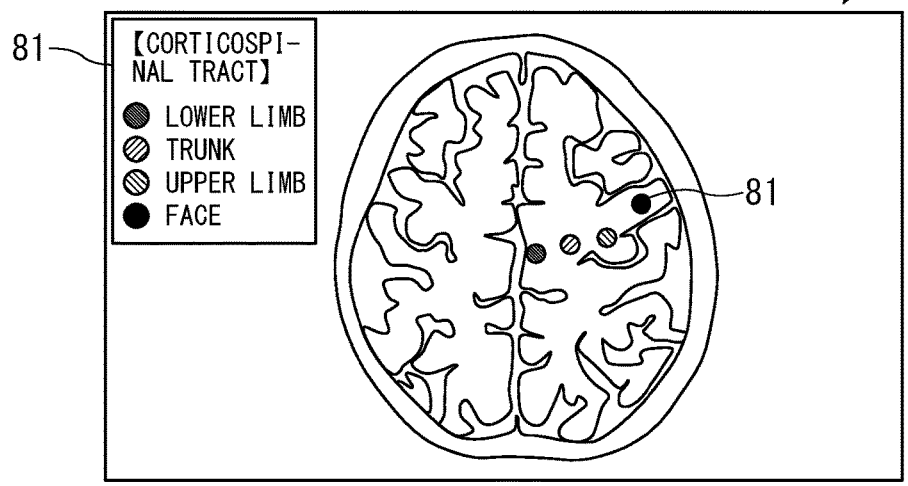
FIG. 8C is an illustration showing a third variant of the superimposed image.

FIG. 8A shows the first variation of superimposed image 80, FIG. 8B shows the second variation, and FIG. 8C shows the third variation.

The superimposed image generation function 205f may generate the superimposed image 80 using the enhanced image 81 in which information such as character strings indicating brain areas are shown, in addition to information on the areas where blood flow has changed (see FIGS. 8A and 8B) shown by color. After the thrombus retrieval procedure, the surgeon may determine whether blood is perfusing to the periphery or not based on the 2D-DSA image, using the TICI (Thrombolysis In Cerebral Infarction) grade or other criteria. Therefore, the superimposed image generation function 205f may include the estimated grade of TICI in the superimposed image 80.

The primary motor cortex may be treated as a single dominant area (see FIG. 8B), or the enhanced images 81 may be generated for each somatotopic localization within the primary motor cortex. Different locations within the primary motor cortex are known to innervate different functions of different body parts, such as the lower limb, trunk, upper limb, and face. Therefore, the superimposed image 80 may be generated to include information on the area of altered blood flow and somatotopic localization to visualize which body region localization was perfused (see FIG. 8C).

Although the above description shows an example of estimating prognostic information about the dominant area of blood vessels whose blood flow has been changed by a procedure in thrombus retrieval treatment for cerebral infarction, the X-ray diagnostic apparatus 100 and the medical image processing apparatus 200 may be used for other flow-improving treatments. For example, in percutaneous coronary intervention (PCI), the correspondence information between the ischemic region already identified based on the SPECT image and the blood vessels feeding the ischemic region is obtained, and the superimposed image 80 may be generated to indicate whether or not the flow changed vessel nourishes the ischemic region based on the thrombus retrieval procedure. In transarterial arterial chemoembolization (TACE), the superimposed image 80 may be generated to show which area of the liver is no longer nourished by the flow changed vessel due to the procedure to embolize the blood vessel nourishing the hepatocellular carcinoma.

The superimposed image 80 may be displayed on a portable display device such as VR goggles or a tablet.

According to the X-ray diagnostic apparatus 100 and the medical image processing apparatus 200, the user can easily obtain information on the dominant area of the blood vessel where the blood flow has changed due to the procedure. Therefore, the X-ray diagnostic apparatus 100 and the medical image processing apparatus 200 according to the embodiment, for example, in the thrombus retrieval procedure for cerebral infarction, the user can easily understand what sensory and motor functions are controlled by the dominant areas that are back to be nourished by the blood vessels with changed blood flow after the procedure, what kind of damage may occur if the dominant areas are not nourished, and which blood vessels that are connected to the dominant areas should be further perfused to improve the prognosis. Therefore, prognosis can be accurately predicted and the termination timing of treatment can be accurately determined.

According to at least one of the embodiments described above, it is possible to estimate prognostic information about the dominant area of a blood vessel whose blood flow has been changed by a procedure.

The processing circuitry in the above-described embodiments is an example of the processing circuitry described in the claims. In addition, the term "processor" used in the explanation in the above-described embodiments, for instance, refers to circuitry such as dedicated or general purpose CPUs (Central Processing Units), dedicated or general-purpose GPUs (Graphics Processing Units), or ASICs (Application Specific Integrated Circuits), programmable logic devices including SPLDs (Simple Programmable Logic Devices), CPLDs (Complex Programmable Logic Devices), and FPGAs (Field Programmable Gate Arrays), and the like. The processor implements various types of functions by reading out and executing programs stored in the memory circuitry.

In addition, instead of storing programs in the memory circuitry, the programs may be directly incorporated into the circuitry of the processor. In this case, the processor implements each function by reading out and executing each program incorporated in its own circuitry. Moreover, although in the above-described embodiments an example is shown in which the processing circuitry configured of a single processor implements every function, the processing circuitry may be configured by combining plural processors independent of each other so that each processor implements each function of the processing circuitry by executing the corresponding program. When a plurality of processors are provided for the processing circuitry, the memory medium for storing programs may be individually provided for each processor, or one memory circuitry may collectively store programs corresponding to all the functions of the processors.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus comprising processing circuitry configured to:
   acquire correspondence information, based on 3D medical image data of an object, that corresponds a blood vessel to information on a dominant area of the blood vessel in a region of the object;
   acquire a plurality of X-ray images each including the blood vessel that are collected at different time phases on the object;
   identify, based on the plurality of X-ray images, a flow changed vessel in which blood flow has changed between the different time phases;
   perform registration between the flow changed vessel and the 3D medical image data; and
   estimate information on the dominant area corresponding to the flow changed vessel based on registration results and the acquired correspondence information.

2. The medical image processing apparatus according to claim 1, wherein the different time phases are time phases before and after a procedure to retrieve a clot in a blood vessel or time phases before and after the procedure to embolize a blood vessel.

3. The medical image processing apparatus according to claim 2, wherein the processing circuitry is configured to generate an enhanced image that enhances the dominant area corresponding to the estimated flow changed vessel and generate a superimposed image in which the enhanced image is superimposed on a medical image based on the 3D medical image data acquired before the procedure.

4. The medical image processing apparatus according to claim 3, wherein, when a dominant area of interest that a user pays attention to among the dominant areas included in the correspondence information is included in the dominant area corresponding to the flow changed vessel, the processing circuitry is configured to generate the superimposed image by generating the enhanced image that enhances at least the dominant area of interest.

5. The medical image processing apparatus according to claim 3, wherein the processing circuitry is configured to generate different enhanced images depending on an amount of blood flow change between the different time phases in the dominant area corresponding to the flow changed vessel.

6. The medical image processing apparatus according to claim 3, wherein
the region of the object is a brain;
each of the dominant areas corresponding to the blood vessels in the correspondence information is an area classified according to a function of the brain; and
the dominant area corresponding to the flow changed vessel is an area nourished by the blood vessel perfused by the clot retrieved by the procedure.

7. The medical image processing apparatus according to claim 6, wherein the area classified according to the function of the brain is an area classified in the calculation of the ASPECTS score or in the Brodmann area.

8. The medical image processing apparatus according to claim 2, wherein the processing circuitry is configured to generate an enhanced image that enhances the dominant area corresponding to the estimated flow changed vessel and generate a superimposed image in which the enhanced image is superimposed on an X-ray image acquired before the procedure.

9. The medical image processing apparatus according to claim 8, wherein, when an anatomical location of the dominant area corresponding to the flow changed vessel overlaps with an anatomical location of a blood vessel in the X-ray image acquired after the procedure, the processing circuitry is configured to generate the enhanced image that enhances the dominant area corresponding to the flow changed vessel to generate the superimposed image.

10. The medical image processing apparatus according to claim 1, wherein the processing circuitry is configured to:
acquire a plurality of X-ray images before and after each procedure as the procedure is repeated;
for each procedure, identify the flow changed vessel in which blood flow has changed between time phases before and after the procedure; and
for the each procedure, perform registration between the flow changed vessel and the 3D medical image data.

11. The medical image processing apparatus according to claim 1, wherein the X-ray images of each of the different time phases are X-ray images including blood vessels imaged from multiple directions.

12. The medical image processing apparatus according to claim 1, wherein the plurality of X-ray images each including the blood vessel is a three-dimensional image generated based on volume data.

13. The medical image processing apparatus according to claim 1, wherein the processing circuitry is configured to perform registration between the flow changed vessel and the 3D medical image data by performing registration between the X-ray image and the 3D medical image data based on a structure of the object depicted in both the 3D medical image data and the X-ray image corresponding to a previous time phase among the different time phases.

14. The medical image processing apparatus according to claim 1, wherein the processing circuitry is configured to perform registration between the flow changed vessel and the 3D medical image data by performing registration between the X-ray image and the 3D medical image data based on an infarct position depicted in both the 3D medical image data and the X-ray image corresponding to a previous time phase among the different time phases.

15. An X-ray diagnostic apparatus comprising:
an imaging device collecting X-ray images including blood vessels by X-ray imaging an object; and
processing circuitry configured to:
acquire correspondence information, based on 3D medical image data of the object, that corresponds a blood vessel to information on a dominant area of the blood vessel in a region of the object;
acquire a plurality of X-ray images collected by the imaging device each including the blood vessel that are collected at different time phases on the object;
identify, based on the plurality of X-ray images, a flow changed vessel in which blood flow has changed between the different time phases;
perform registration between the flow changed vessel and the 3D medical image data; and
estimate information on the dominant area corresponding to the flow changed vessel based on registration results and the acquired correspondence information.

16. The X-ray diagnostic apparatus according to claim 15, wherein the different time phases are time phases before and after a procedure to retrieve a clot in a blood vessel or time phases before and after the procedure to embolize a blood vessel.

17. The X-ray diagnostic apparatus according to claim 16, wherein the processing circuitry is configured to generate an enhanced image that enhances the dominant area corresponding to the estimated flow changed vessel and generate a superimposed image in which the enhanced image is superimposed on a medical image based on the 3D medical image data acquired before the procedure.

18. The X-ray diagnostic apparatus according to claim 16, wherein the processing circuitry is configured to generate an enhanced image that enhances the dominant area corresponding to the estimated flow changed vessel and generate a superimposed image in which the enhanced image is superimposed on an X-ray image acquired before the procedure.

19. The X-ray diagnostic apparatus according to claim 18, wherein, when an anatomical location of the dominant area corresponding to the flow changed vessel overlaps with an anatomical location of a blood vessel in the X-ray image acquired after the procedure, the processing circuitry is configured to generate the enhanced image that enhances the dominant area corresponding to the flow changed vessel to generate the superimposed image.

20. A non-transitory computer-readable medium storing a program causing a computer to perform the steps of:
acquiring correspondence information, based on 3D medical image data of an object, that corresponds a blood vessel to information on a dominant area of the blood vessel in a region of the object;
acquiring a plurality of X-ray images each including the blood vessel that are collected at different time phases on the object;
identifying, based on the plurality of X-ray images, a flow changed vessel in which blood flow has changed between the different time phases;
performing registration between the flow changed vessel and the 3D medical image data; and
estimating information on the dominant area corresponding to the flow changed vessel based on alignment results and the acquired correspondence information.

* * * * *